(12) United States Patent
Osada et al.

(10) Patent No.: US 6,477,127 B1
(45) Date of Patent: Nov. 5, 2002

(54) RECORDING/PLAYBACK APPARATUS CAPABLE OF CARRYING OUT LINKING ON OPTICAL DISK, AND OPTICAL DISK RECORDED WITH LINKED DATA

(75) Inventors: Yutaka Osada, Kanagawa-ken (JP); Yuichi Hasegawa, Kanagawa-ken (JP); Ken Miyazaki, Kanagawa-ken (JP)

(73) Assignee: Victor Company of Japan, Limited, Yokohama (JP)

(*) Notice: Subject to any disclaimer, the term of this patent is extended or adjusted under 35 U.S.C. 154(b) by 0 days.

(21) Appl. No.: 09/484,545

(22) Filed: Jan. 17, 2000

(30) Foreign Application Priority Data

Jan. 19, 1999 (JP) ............................................. 11-011114

(51) Int. Cl.⁷ ........................................... G11B 7/0045
(52) U.S. Cl. ............................... 369/59.25; 369/47.23; 369/59.26; 369/59.25; 369/47.28
(58) Field of Search ............................. 369/59.1, 47.1, 369/44.11, 275.1, 59.25, 59.26, 53.21, 47.23, 47.28, 53.35

(56) References Cited

U.S. PATENT DOCUMENTS 5,408,478 A * 4/1995 Ohmori et al. ............ 371/37.5
5,634,031 A * 5/1997 Sakuma ...................... 395/438
6,147,957 A * 11/2000 Nagara et al. .............. 369/116
6,195,325 B1 * 2/2001 Okanishi ............... 369/124.08
6,269,069 B1 * 7/2001 Ishida et al. .............. 369/275.3
6,335,911 B1 * 1/2002 Kuroda ...................... 369/53.2

OTHER PUBLICATIONS

Y. Tanaka, "Aspherical Molded Glass Lens for Optical Disk Drive", in *Microoptics News, Group of Microoptics, Japan Society of Applied Physics Optics Division*, vol. 6, No. 3, Sep. 27, 1988.

* cited by examiner

Primary Examiner—W. R. Young
Assistant Examiner—Gautam R. Patel
(74) Attorney, Agent, or Firm—Gary M. Nath; Harold L. Novick; Marvin C. Berkowitz

(57) ABSTRACT

A video disk recorder has a function for carrying out a linking on an optical disk and contains a predetermined data building-in circuit for supplying a predetermined fixed data as a playback data. Upon linking, a linking point is placed in a CPM area on the optical disk and the fixed data is recorded in this CPM area. Upon playback of the CPM area in which the linking is carried out, the fixed data supplied from the predetermined data building-in circuit is read out as the playback data.

4 Claims, 9 Drawing Sheets

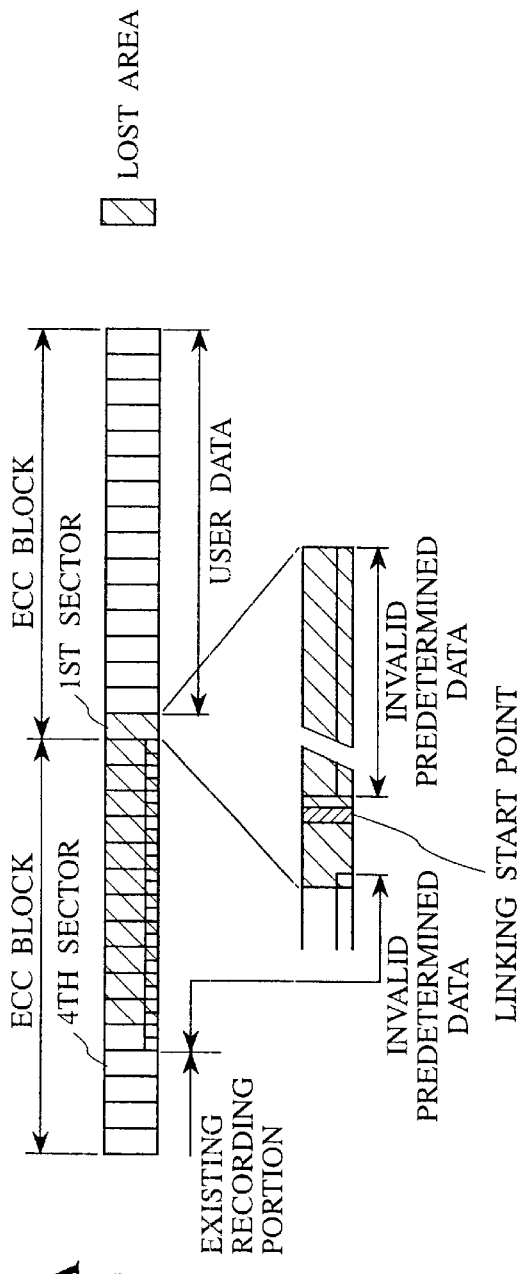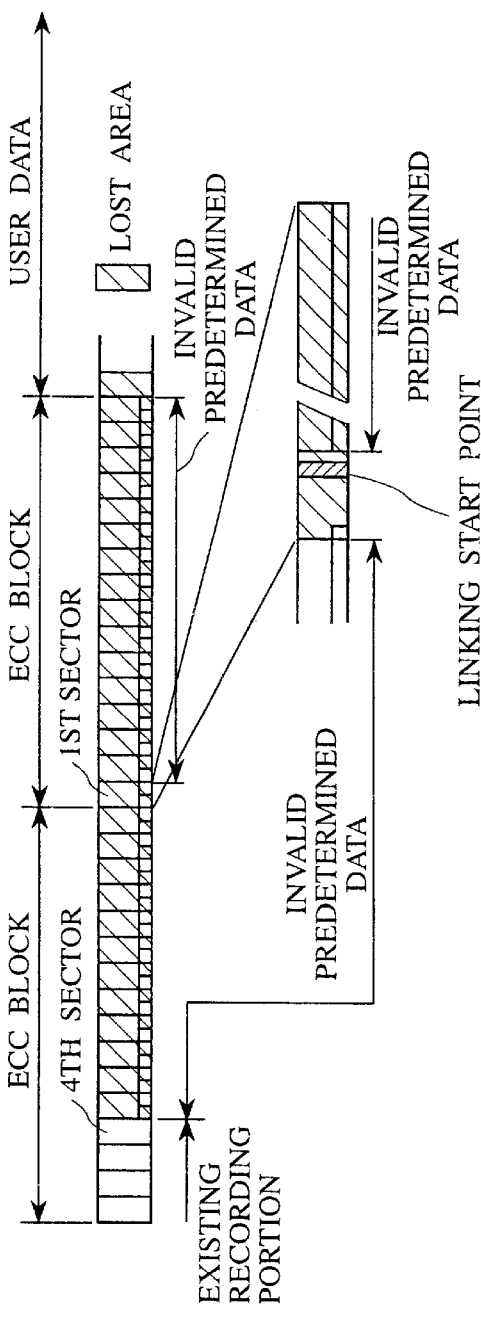
FIG. 1A PRIOR ART
FIG. 1B PRIOR ART

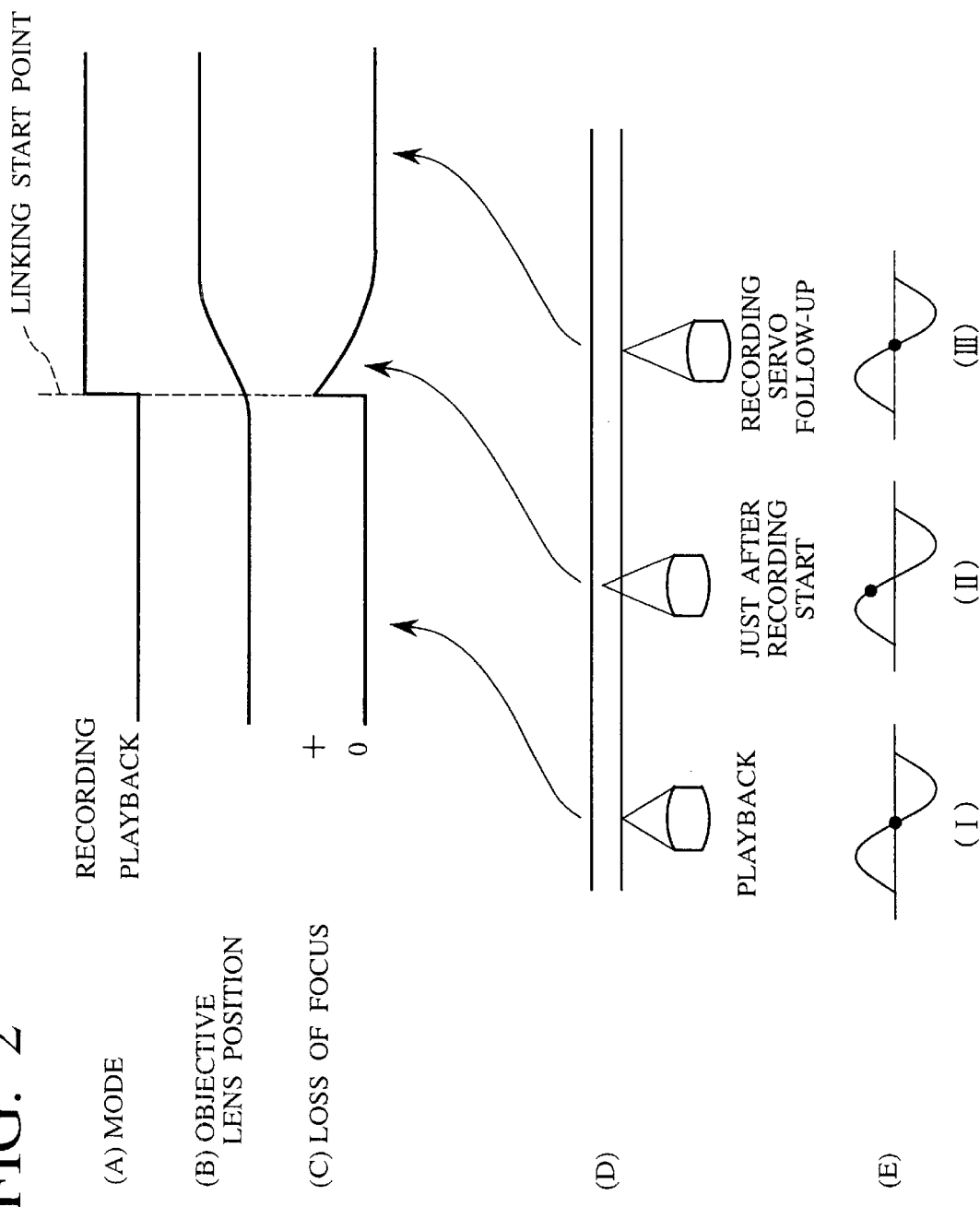

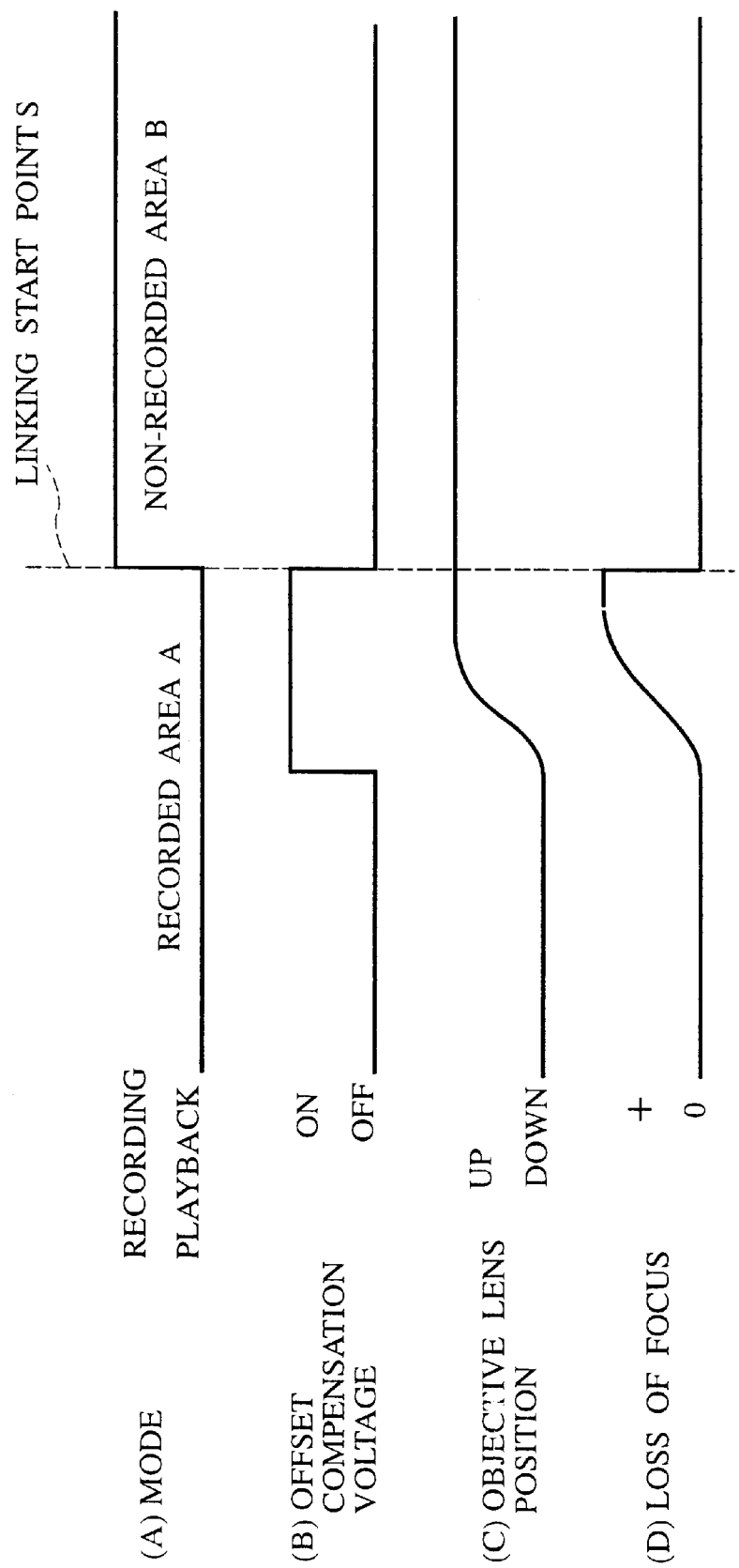

RECORDING/PLAYBACK APPARATUS CAPABLE OF CARRYING OUT LINKING ON OPTICAL DISK, AND OPTICAL DISK RECORDED WITH LINKED DATA

BACKGROUND OF THE INVENTION

1. Field of the Invention

The present invention relates to a recording/playback apparatus for an optical disk for recording and playing back data signal on/from the recordable/reproducible optical disk such as CD-R, CD-RW, DVD and the like and an optical disk(disc) therefor.

2. Description of the Related Art

Recently, a demand for a large capacity optical disk capable of recording a large amount of data has been rising and to meet such a demand, for example, such an optical disk as DVD-R has appeared. In this optical disk, there has been demanded a recording method in which when new data is additionally recorded subsequent to an already recorded area ("additional recording", "linking", "after recording"), new data is recorded finely not so as to produce a waste data, thereby using the capacity of the optical disk to a maximum extent.

However, at a border between old and new data in a linking portion on a conventional recordable/reproducible optical disk described above, old and new data needs to be linked at a higher accuracy than a rotation accuracy of a spindle motor for rotating the optical disk (for example, the linking accuracy needs to be 10,000 times the rotation accuracy). Thus, a deviation of rotating phase of the spindle motor (for example, wow and flutter) affects the accuracy badly. Further, in case where an optical disk containing old data is recorded with other recording unit, a deviation of the rotating phase between the spindle motors of different recording units having old and new data respectively affects the linking accuracy more badly.

As a result, a timing between a recording termination point of old data and a linking start point deviates so that a large gap occurs between the recording termination point and linking start point, or the linking start point is located in front of(before) the recording termination point. Consequently, a non-recorded gap is produced between old and new data so that incontinuity occurs between the old and new data, or a beginning of the new data is written over a rear portion of the old data.

As described above, the new data may not be recorded continuously with the old data, thereby leading to a cause for an error which may occur when the old and new data are played back continuously.

As a method for preventing such an error, a method in which the linking is started apart by a predetermined length from a final end of an area in which the old data is recorded has been employed since before. FIGS. 1A, 1B show an example of a conventional linking method as such a preventing method.

In concentrically or spirally formed tracks of a recordable/reproducible optical disk such as CD-R, CD-RW and DVD, a plurality of sectors are formed to attain CAV (constant angular velocity) or CLV (constant linear velocity). Here, an error correction code (ECC) block is composed with 16 sectors as a group.

If a last recording (already recorded portion) is terminated halfway of the ECC block(fourth sector) in an example shown in FIG. 1A, an invalid predetermined data is recorded after a final end of that ECC block up to a predetermined position in a first sector of a next ECC block. When additional recording is to be carried out, the invalid predetermined data is recorded from the predetermined position in the first sector up to a final end of the first sector and then user data is recorded from a beginning of a second sector.

On the other hand, in an example shown in FIG. 1B, if the last data recording (recorded portion) is terminated halfway of the ECC block (fourth sector), an invalid data is recorded after a final end of that ECC block up to a predetermined position of a first sector of a next ECC block, and when the additional recording is to be carried out, the invalid data is recorded from the predetermined position of the first sector up to a final end of the ECC block and then, user data is recorded from a beginning of the next ECC block.

In these conventional linking system, invalid data is written after the recording termination point (fourth sector which is a terminal end of an existing recording portion) of old data and invalid predetermined data is written just after a recording start point (linking start point) of new data. A recording interval of this invalid predetermined data is along enough for absorbing all bad influence of a deviation (for example, wow and flutter) of a rotating phase of the aforementioned spindle motor. Thus, even if there is a gap or overwrite between old and new data, this disadvantage occurs in a range of the invalid predetermined data to such an extent that it can be absorbed, so that destruction of a rear end of the old data can be avoided.

However, because this invalid predetermined data exists in the recording area for recording new data, a recording capacity for new data which can be recorded in this recording area decreases. As a result, as the frequency of the linking increases, the recording capacity of new data decreases. For this reason, there is a problem that although there is a large recording capacity capable of recording a large amount of data, all of this recording capacity cannot be used for recording such a large amount of data.

Further, as other problem relating to the linking, there is a write error which is caused by a loss of focus(de-focus) of laser beam emitted from a pickup at a linking starting point. That is, although upon linking, playback of old data needs a low power for emitting the laser beam, this power needs to be changed to a high power continuously to additionally record new data in succession with this old data. Thus, if the mode changes from the playback mode to the recording mode upon linking as shown in section (A) of FIG. 2, the change of focus error occurs as shown in (I) to (III) of section (E) of FIG. 2 with a change of the laser power, so that a loss of the focus occurs. In other words, the laser beam which is focused accurately when the playback mode is selected become out of focus if the mode is changed to the recording mode. To eliminate this loss of the focus ((II) of section (E) of FIG. 2), the pickup 2 is lifted up and down (sections (B), (C) and (D) of FIG. 2) by the focus servo with respect to a signal surface of the optical disk and after a predetermined time elapses, a focus on the optical disk is obtained ((III) of sections (D) and (E) of FIG. 2).

A loss of the focus ((II) of section (E) of FIG. 2) occurs at a linking start point where the mode needs to be changed from the playback mode to the recording mode so that the focus is not on the optical disk just after additional recording is started ("just after recording is started" shown in section (D) of FIG. 2). Consequently, a recording pit of a normal size is not formed accurately at a beginning of new data, thereby leading to a cause for an error which may occur when old and new data are played back continuously.

SUMMARY OF THE INVENTION

Accordingly, the present invention has been accomplished in views of the above problems and therefore, an object of the invention is to provide an optical disk recording/playback apparatus in which upon carrying out so-called linking of additionally recording new data subsequent to a recording area in which data is already recorded on an optical disk capable of additionally recording, a recording termination point of existing recording data and a linking start point S for additional recording data are set up in a predetermined area (e.g., CPM area in specific sector S1 shown in sections (A) to (D) of FIG. 4) other than a data area in which new data is recorded and the new data is recorded in an area subsequent to the predetermined area, and an optical disk in which such data is recorded.

Further, another object of the invention is to provide an optical disk recording/playback apparatus in which upon carrying out so-called linking of additionally recording new data subsequent to a recording area in which data is already recorded on an optical disk capable of additionally recording, a recording termination point is detected in a data area for recording new data or even in a predetermined area other than the data area for recording new data, and in order not to produce incontinuity between a reproduction clock obtained by playing back existing recording data and a recording clock for use in additionally recording new data, a recording clock synchronous-with the playback clock is changed to a recording clock generated based on a reference signal recorded in an optical disk preliminarily so as to achieve additional recording of new data.

Further, still another object of the invention is to provide an optical disk recording/playback apparatus for generating and holding a compensation signal for eliminating a loss of a focus of a pickup which may occur when the playback state of information signal recorded in the existing recording area is changed to additional recording state for additionally recording new information signal, and having a structure for outputting a compensation signal to a focus error detecting means, thereby preventing inability of recording a beginning portion of new data to be additionally recorded in a normal state, because of a loss of focus which occurs due to a large deflection of laser beam power caused when the playback state is changed to the recording state just after a linking start.

To achieve the above object, there is provided an optical disk recording/playback apparatus for recording and playing back information signal using an optical disk capable of additionally recording new information signal subsequent to existing recording area in which information signal is recorded, the optical disk recording/playback apparatus comprising: a data generating means for setting a linking start point for additionally recording in a predetermined area subsequent to the existing recording area and generating predetermined data to be recorded in an area from the linking start point up to a termination point of the predetermined area to output the predetermined data; a signal recording means for inputting the predetermined data from the data generating means so as to record the predetermined data from the linking start point up to the termination point of the predetermined area and recording the new information signal in an area subsequent to the predetermined area; and a playback means, upon detecting a portion corresponding to the predetermined area from the played-back information signal, for reading no information signal from this portion.

In a preferred embodiment of the present invention, upon detecting the portion corresponding to the predetermined area from the played-back information signal, the playback means reads no information signal from the portion but outputs a second predetermined data assuming that the second predetermined data is read instead.

In a preferred embodiment of the present invention, the data generating means sets up cyclically a multiplicity of predetermined areas in a recordable area in the optical disk.

In a preferred embodiment of the present invention, the signal recording means records the predetermined data from a termination point of the existing recording area up to the linking start point.

In a preferred embodiment of the present invention, the data generating means sets a specific area in each sector of the recordable area as the predetermined area.

In a preferred embodiment of the present invention, the specific area is an area located behind an ID area and in front of an user data area.

To achieve the above object, there is provided an optical disk recording/playback apparatus for recording and playing back information signal using an optical disk capable of additionally recording new information signal subsequent to existing recording area in which information signal is recorded, the optical disk recording/playback apparatus comprising: a playback clock generating means for generating and outputting a playback clock from information signal recorded in the existing recording area; a recording clock generating means for generating and outputting a recording clock based on a reference signal recorded in the optical disk; a linking start point generating means for detecting a recording termination point of information signal recorded in the existing recording area and changing a recording clock synchronized with the playback clock to the recording clock generated based on the reference signal so as not to produce an incontinuity between the playback clock and recording clock at the termination point to generate a linking start point; and a recording signal generating means for starting output of new information signal synchronous with the recording clock generated based on the reference signal from the linking start point.

Further, to achieve the above object, there is provided an optical disk recording/playback apparatus for recording and playing back information signal using an optical disk capable of additionally recording information signal subsequent to a recording area in which information signal is recorded, the optical disk recording/playback apparatus comprising: a focus error detecting means for detecting a focus error of a pickup; a focus control means for controlling focusing of the pickup so as to eliminate the focus error by inputting the focus error; and a compensating means for generating/holding a compensation signal so as to eliminate a loss of focus of the pickup which is produced when playback state of information signal recorded in the existing recording area is changed to additional recording state for additionally recording new information signal and outputting the compensation signal to the focus control means at the change-over time.

Further, to achieve the above object, there is provided an optical disk capable of additionally recording information signal subsequent to existing recording area in which information signal is recorded, wherein a linking start point for additional recording is set up in a predetermined area subsequent to the existing recording area, a predetermined data is recorded from the linking start point up to a termination point of the predetermined area, and new information signal is recorded in a new recording area subsequent to the predetermined area.

In a preferred embodiment of the present invention, a plurality of predetermined areas are set cyclically.

In a preferred embodiment of the present invention, a specific area in each sector is the predetermined area.

In a preferred embodiment of the present invention, the specific area is located behind an ID area and in front of an user data area.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A, 1B are explanatory diagrams for explaining a linking system of a conventional video disk recorder;

FIG. 2 is an explanatory diagram of a focus error which may occur upon linking in a video disk recorder;

FIG. 9 is a diagram for explaining a linking operation of a video disk recorder according to the third embodiment of the optical disk recording/playback apparatus of the present invention.

DESCRIPTION OF THE PREFERRED EMBODIMENTS

Hereinafter, the optical disk recording/playback apparatus and optical disk of the present invention will be described with reference to FIGS. 3–9.

Figure 3:
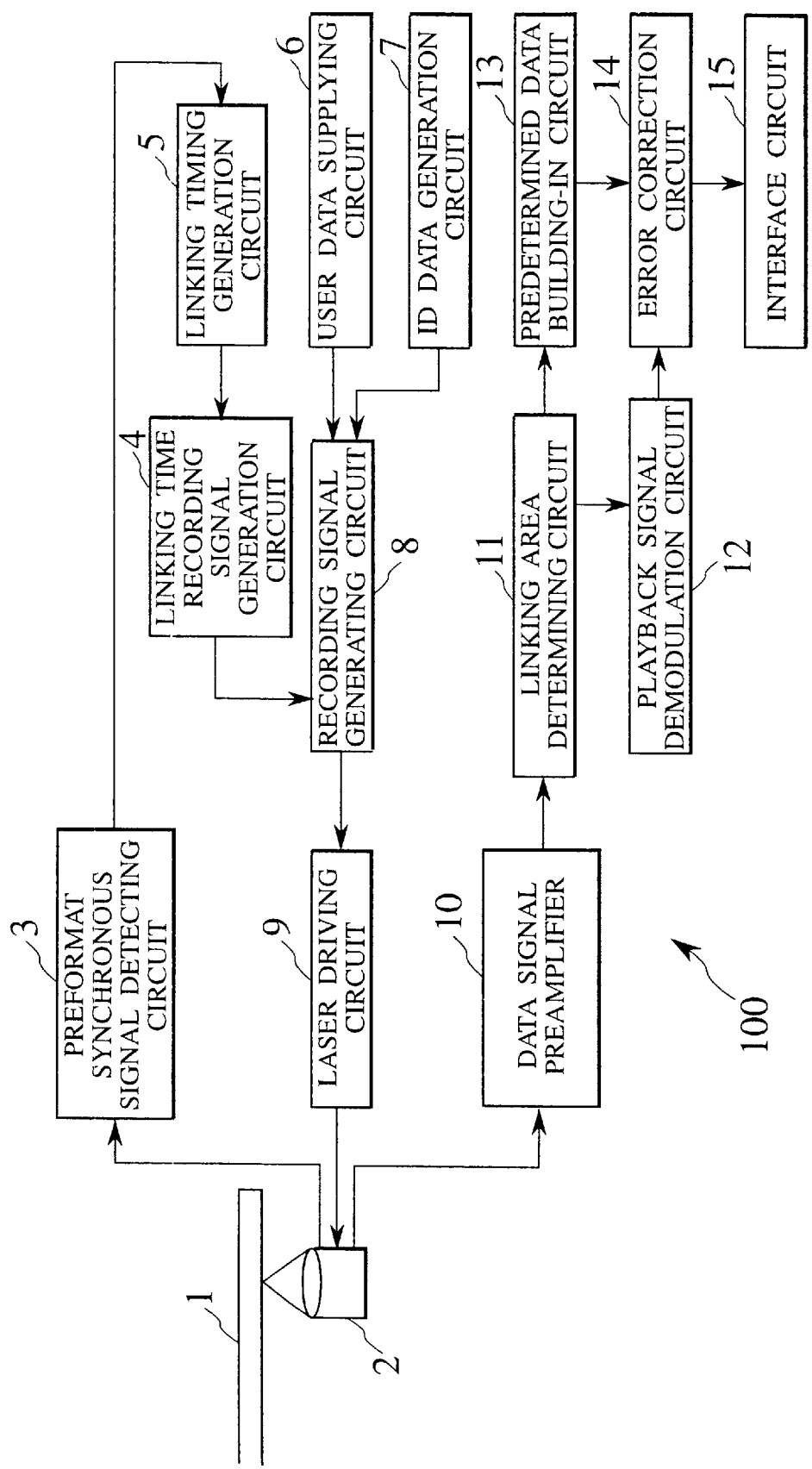
FIG. 3 is a block diagram showing schematically a video disk recorder according to a first embodiment of an optical disk recording/playback apparatus of the present invention.
Figure 4:
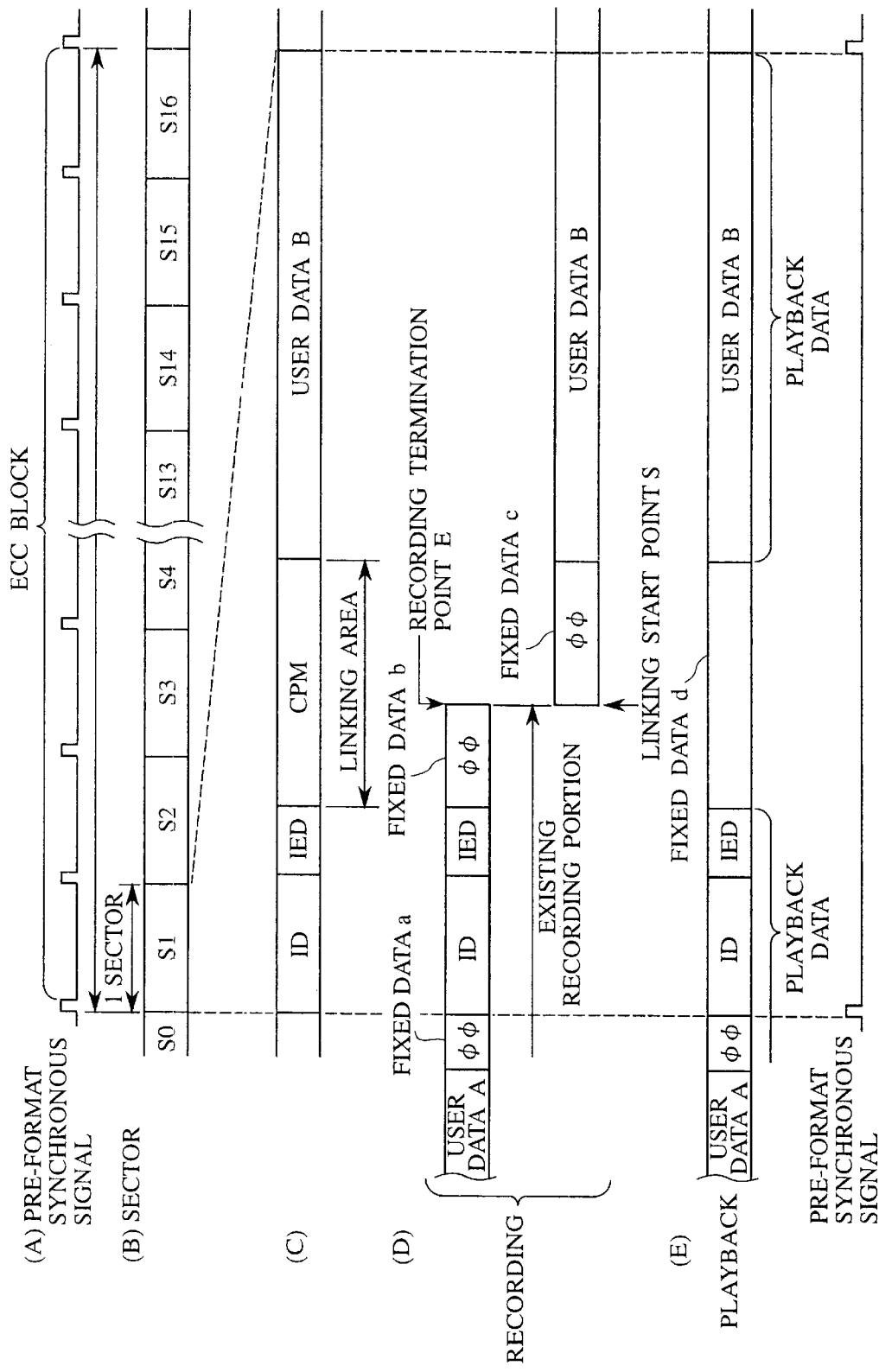
FIG. 4 is a diagram for explaining a recording/playback operation of a video disk recorder according to the first embodiment of the optical disk recording/playback apparatus of the present invention.

The optical disk recording/playback apparatus of the present invention is an optical disk recording/playback apparatus (video disk recorder 100) for recording and playing back information signal using an optical disk 1 capable of additionally recording information signal (user data B) subsequent to existing recording area in which information signal (user data A) is recorded, as shown in FIGS. 3, 4. The optical disk recording/playback apparatus of the present invention comprises a data generating means for setting a linking start point S for additionally recording in a predetermined area (CPM area in sector S1) subsequent to the existing recording area; a signal recording means for recording from the linking start point S up to an terminal and of the predetermined area (CPM area) by inputting the predetermined data from the data generating means and recording new information signal in an area (user area for storing user data B) subsequent to the predetermined area; and a playback means in which if a portion corresponding to the predetermined area is detected from the played-back information signal at the time of playback, no information signal is read from this portion.

Here, the data generating means comprises a linking time recording signal generation circuit 4 and a linking timing generation circuit 5. The signal recording means comprises a user data supplying circuit 6, ID data generation circuit 7, recording signal generation circuit 8, and laser driving circuit 9. The playback means comprises a linking area determining circuit 11, playback signal demodulation circuit 12, predetermined data building-in circuit 13, error correction circuit 14 and interface circuit 15.

Figure 5:
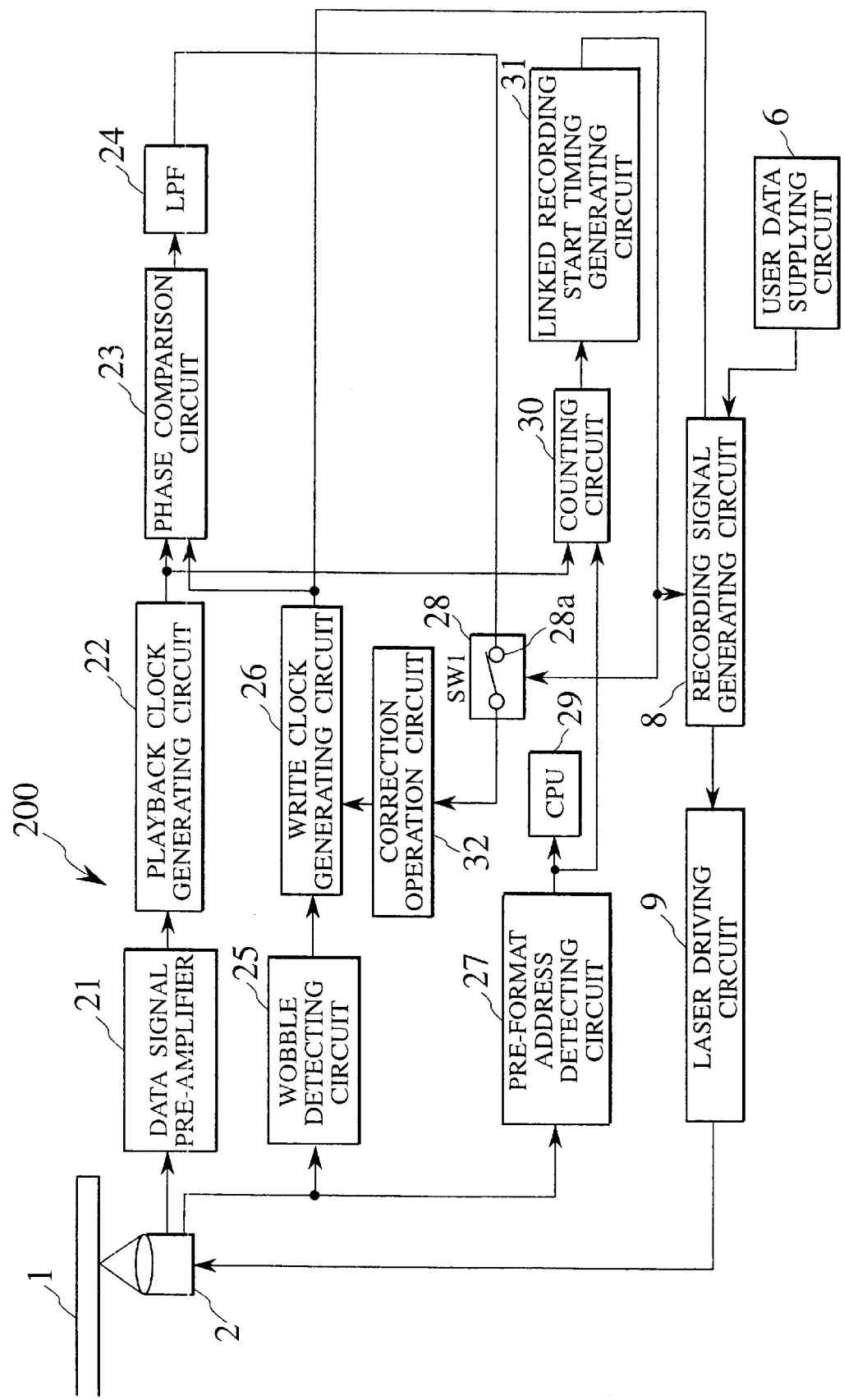
FIG. 5 is a block diagram showing schematically a video disk recorder according to a second embodiment of the optical disk recording/playback apparatus of the present invention.
Figure 6:
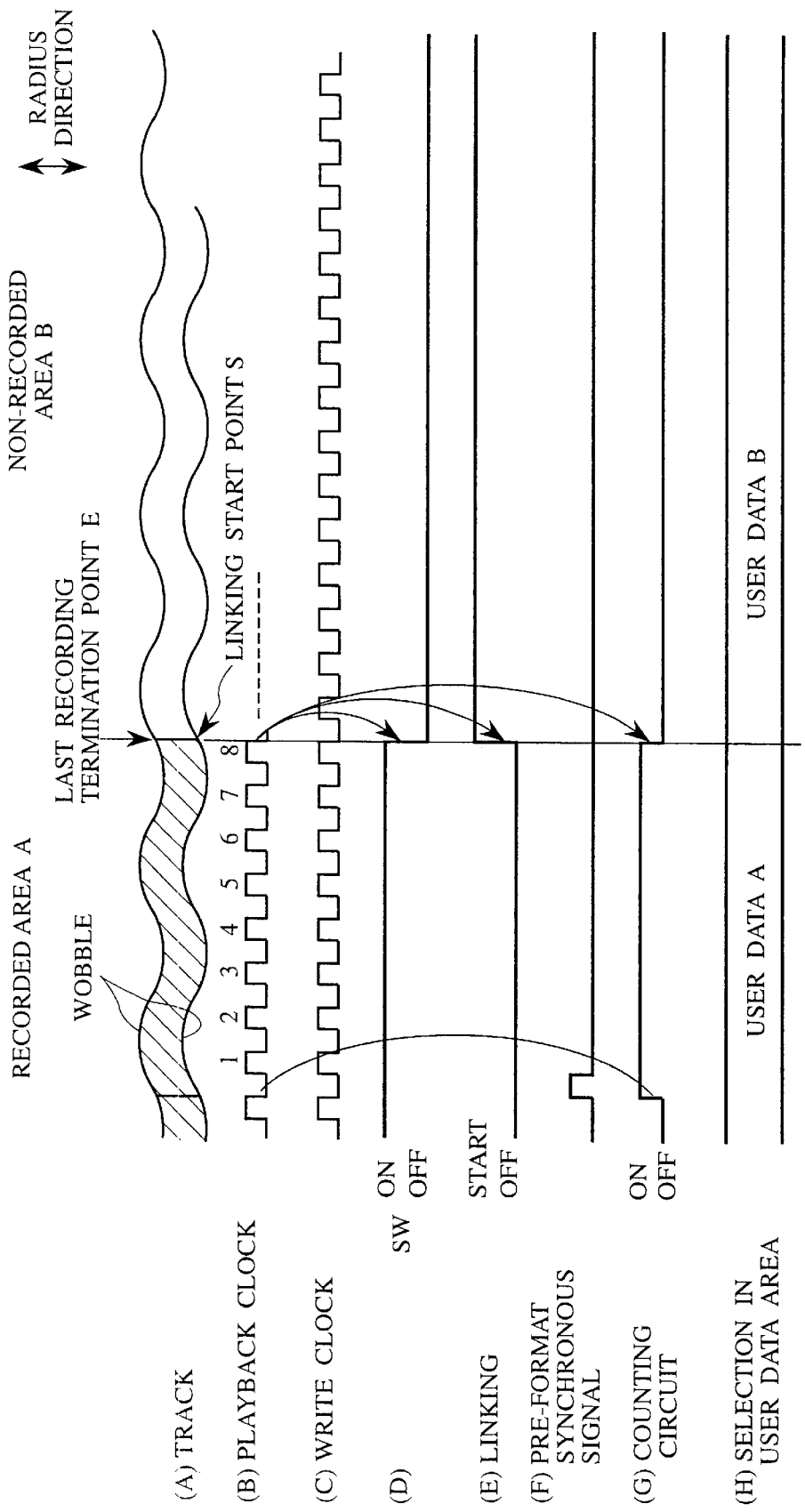
FIG. 6 is a diagram for explaining a recording/playback operation of a video disk recorder according to the second embodiment of the optical disk recording/playback apparatus of the present invention.

As shown in FIGS. 5, 6, the optical disk recording/playback apparatus of the present invention is an optical disk recording/playback apparatus (video disk recorder 200) for recording and playing back information signal using an optical disk 1 capable of additionally recording new information signal (user data B) in an area (not-recorded area shown in FIG. 6) subsequent to the existing recording area (recorded area shown in FIG. 6) in which information signal (user data A) has been already recorded. The optical disk recording/playback apparatus of the present invention is an optical disk recording/playback apparatus (video disk recorder 200) for recording and playback comprising: a playback clock generating means for generating and outputting a playback clock from information signal (user data A) recorded in the existing recording area; a recording clock generating means for generating and outputting recording clock based on a reference signal (wobble signal) recorded in the optical disk 1; a linking start point generating means for detecting a recording termination point E of information signal (user data A) recorded in the existing recording area and changing a recording clock (write clock) synchronized with the playback clock to a recording clock (write clock) generated based on the reference signal (wobble signal) so as not to produce an incontinuity between the playback clock and recording clock (write clock) at this termination point E to generate a linking start point S; and a recording signal generating means for starting output of new information signal (user data B) synchronous with a recording clock (write clock) generated based on the reference signal (wobble signal) from the linking start point S.

The playback clock generating means comprises a playback clock generating circuit 22. The recording clock generating means includes a write clock generating circuit 26. The linking start point generating means comprises a phase comparison circuit 23, low pass filter 24, selection switch 28, control circuit 29, counting circuit 30, linked recording start timing generating circuit 31 and correction operation circuit 32. The recording signal generating means includes the recording signal generation circuit 8.

Figure 7:
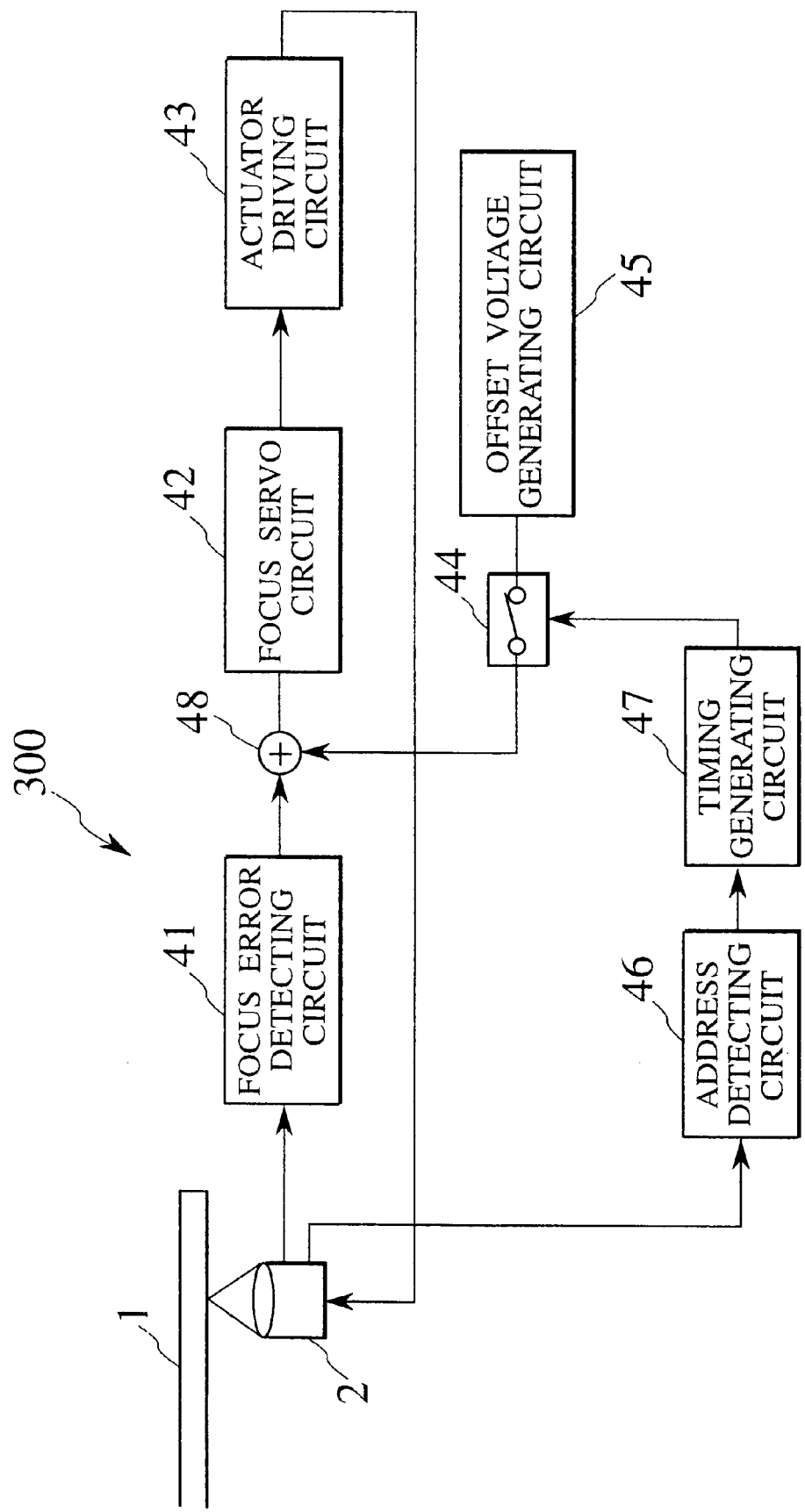
FIG. 7 is a block diagram showing schematically a video disk recorder according to a third embodiment of the optical disk recording/playback apparatus of the present invention.
Figure 8:
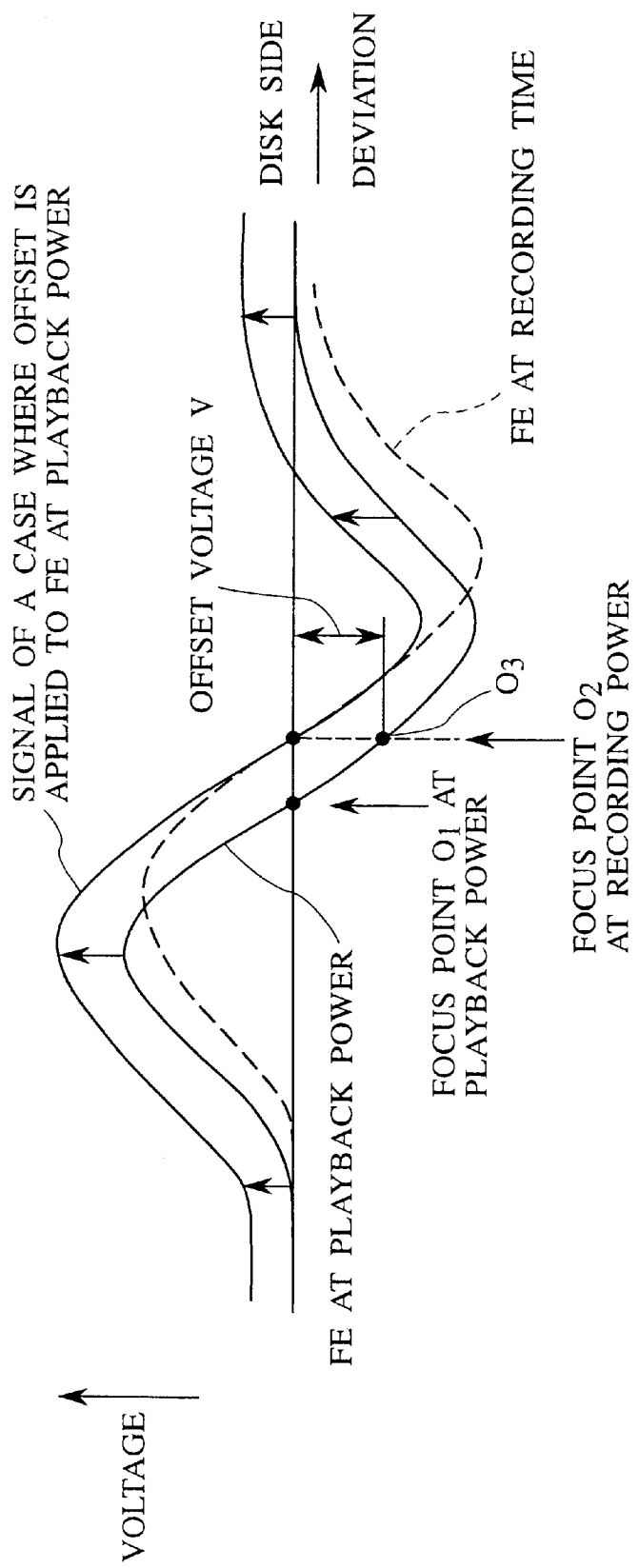
FIG. 8 is a diagram showing a relation between a voltage of focus error signal and a deviation of a pickup.

As shown in FIG. 7 to FIG. 9, the optical disk recording/playback apparatus of the present invention is an optical disk recording/playback apparatus (video disk recorder 300) for recording and playing back information signal using an optical disk 1 capable of additionally recording information signal (user data B) subsequent to the recording area (a recorded area just up to the linking start point S shown in FIG. 9) in which information signal (user data A) is recorded. The optical disk recording/playback apparatus of the present invention is an optical disk recording/playback apparatus comprising a focus error detecting means for detecting a focus error of a pickup 2; a focus control means for controlling focusing of the pickup so as to eliminate the focus error by inputting the focus error; and a compensating means for generating/holding a compensation signal (offset compensation voltage for compensating for a loss of focus) so as to eliminate a loss of focus of the pickup 2 which is produced when playback state of information signal recorded in the existing recording area is changed to additional recording state for additionally recording new information signal (linking start point S) and outputting the compensation signal to the focus control means at the aforementioned change-over time.

Here, the focus error detecting means includes a focus error detecting circuit 41. The focus control means comprises a focus servo circuit 42 and an actuator drive circuit 43. The compensation means comprises a selection switch 44, offset voltage generating circuit 45 and timing generating circuit 47.

The optical disk of the present invention is an optical disk 1 capable of additionally recording information signal (user data B) subsequent to the existing recording area in which information signal (user data A) is recorded, as shown in FIG. 4, in which a linking start point S for additional recording is set up in a predetermined area (CPM area in sector S1) subsequent to the existing recording area, a predetermined data c is recorded from this linking start point S up to a terminal end of the predetermined area (CPM area) and new information signal (user data B) is recorded in a recording area (user area for storing user data B)subsequent to the predetermined area.

The predetermined area (CPM area) mentioned above is an area which is located behind the ID area in the specific sector S1 and in front of user data area.

Hereinafter, first embodiment-third embodiment of the optical disk recording/playback apparatus of the present invention will be described in detail.

First Embodiment
(Structure of Video Disk Recorder 100)

A first embodiment of the optical disk recording/playback apparatus of the present invention will be described in detail. FIG. 3 is a block diagram showing schematically a video disk recorder 100 according to the first embodiment of the optical disk recording/playback apparatus of the present invention.

In the same Figure, the video disk recorder 100 records and plays back information signal on and from an optical disk 1 via a pickup 2 and particularly, has a function for additionally recording new information signal in the back of an area in which the information signal is already recorded (hereinafter referred to as "linking").

The optical disk 1 is a recording medium such as CD-R, CD-RW, DVD in which data signal can be recorded. A preformat synchronization signal for generating a write clock for use in recording is recorded in track of the optical disk 1.

A preformat synchronous signal detecting circuit 3 for detecting the aforementioned preformat synchronous signal is connected to the pickup 2. A linking timing generating circuit 5 for generating a linking timing based on a read clock generated from the preformat synchronous signal is connected to this preformat synchronous signal detecting circuit 3 and a upon-linked(linking time) recording signal generating circuit 4 for generating a upon-linking(linking time) recording signal (fixed data after the linking start point S described later) is connected to this linking timing generation circuit 5. Then, this upon-linking recording signal is transmitted to a recording signal generating circuit 8.

This recording signal generating circuit 8 is connected to the laser driving circuit 9 and a user data supplying circuit 6 for supplying user data B to be recorded in the optical disk 1 and an ID data generating circuit 7 for generating ID data of each sector as well as user data B are connected to the recording signal generating circuit 8. The recording signal generating circuit 8 selects either the upon-linking recording signal (fixed data c after the linking start point S) or a series of data including ID data, IDE data and user data B, depending on whether the linking area (indicated in (C) of FIG. 4) or other area (ID, IED, user data (indicated in (C) of FIG. 4) is recorded in each sector and generates such a recording signal and transmits to the laser driving circuit 9.

A data signal preamplifier 10 for amplifying read data signal upon playback mode is connected to the pickup 2 and the data signal amplified here is transmitted to the linking area determining circuit 11. This linking area determining circuit 11 analyzes the read data signal so as to determine whether or not the data is played back from the linking area (indicated in (C) of FIG. 4) or other area (ID, IED, user data (indicated in (C) of FIG. 4). If the data is reproduced from other area than the linking area, the linking area determining circuit 11 transmits data signal to the error correction circuit 14 and interface circuit 15 via the playback signal demodulation circuit 12. On the other hand, if the data is played back from the linking area, the linking area determining circuit 11 transmits a predetermined fixed data d (indicated in (E) of FIG. 4) from the predetermined data building-in circuit 13 to the error correction circuit 14.

The predetermined data building-in circuit 13 is a circuit for supplying the fixed data d as playback data and if the linking area determining circuit 11 detects a linking area (CPM area), the predetermined data building-in circuit 13 outputs the fixed data d to the error correction circuit 14 instead of the data signal (fixed data b, c, indicated in (D) of FIG. 4) outputted from the data signal preamplifier 10.

(Operation of the Video Disk Recorder 100)

Next, an operation for linking with the video disk recorder having such a structure will be described. FIG. 4 is a diagram for explaining a recording/playback operation of the video disk recorder 100 according to the first embodiment of the optical disk recording/playback apparatus of the present invention.

According to this embodiment, a repeating area in which the same content data is recorded repeatedly over plural sectors is provided on the optical disk 1. First, this will be described. FIG. 4 shows a structure of data sector on the optical disk 1.

As shown in sections (A)–(C) of FIG. 4, sectors S1, S2, S3, S4, . . . Sn are formed synchronously with preformat synchronous signal ((A) of FIG. 4) recorded in track preliminarily on the optical disk 1 and an ECC block is composed of 16 sectors S1–S16 ((B) of FIG. 4) while 16 sectors constitutes a single cycle. Each sector has an ID area in which an ID number of each sector is recorded at the head portion thereof, and includes IED area attached to that ID, CPM area provided in each sector and user data area in which user data is recorded ((C) of FIG. 4).

The CPM area is a reserved area for coping with additional information such as copy protect and future demand. This CPM area is located behind the ID area of each sector and in front of user data area.

If user data of the same file is written dividedly in plural sectors, the same content of additional information is written in each CPM area of the plural sectors. For example, if user data to be written dividedly in plural sectors is data which is permitted to be copied only once according to copy right or the like, write inhibit data for inhibiting copy is recorded repeatedly in the CPM area of each of all the sectors in which that user data is written. According to recording style of the CPM area, even if a CPM area in which the same content data is recorded repeatedly is used for linking, the function of copy protect is not affected.

In the video disk recorder 100 of this embodiment, linking is started within the CPM area. When recording of preceding user data A is terminated as shown in sections (C), (D) of FIG. 4, the recording termination point E is located within the CPM area. For example, if user data A is terminated in sector S0 before sector S1, a fixed data a is recorded from a final end of the data A up to a beginning of the next sector S1. After the ID and IED of the sector S1 are recorded, a fixed data b is recorded up to halfway of the CPM area.

After that, when linking for user data B is to be carried out, the linking start point S is located within the CPM area of sector S1 containing the recording termination point E. At this time, a fixed data C is recorded in the CPM area ahead of the user data B.

On the other hand, in case where user data B recorded additionally in this way is played back in succession with the user data A recorded in advance, as shown in section (E) of FIG. 4, user data A in sector S0, and ID area and IED area in the sector S1 are played back as usual. Then, the linked CPM area is played back assuming that the predetermined data d is always recorded regardless of the content of data signal recorded here.

In other words, because data may be destroyed due to a gap, overwrite or the like in the linking area, if that linking area is read out as usual, a playback error may occur. Thus, in the video disk recorder 100 of this embodiment, user data is played back assuming that the fixed data d is recorded, regardless of whether data in the CPM area in which no user data is recorded is effective or destroyed. More specifically, when data signal is read out from the optical disk 1, the fixed data d supplied from the predetermined data building-in circuit 13 is played back by skipping that CPM area or neglecting data b, c read out from the CPM area.

Although according to this embodiment, φ (that is, "0") is used as each of the aforementioned fixed data a, b, c, d, other value than the one is permitted and it is needless to say that the amount of each data may be set up as required. (Effect of the Video Disk Recorder 100)

In the video disk recorder 100 of this embodiment, the fixed data b, c are recorded in the CPM area and when the CPM area is played back, the fixed data b, c played back from the optical disk 1 are not used as the playback data, but the fixed data d is used. Thus, even if the fixed data b, c in a linking area is destroyed upon linking, a read error in the linking area can be avoided, so that the linked data can be always played back excellently from a beginning of that data.

Because according to this embodiment, the CPM area is used as the linking area, no user data area is wasted, so that a problem that the effective recording capacity is reduced by the linking can be solved. Because the CPM area is an area in which the same content data is recorded repeatedly over plural sectors, even if one of them is used, a function thereof is not affected.

Second Embodiment
(Structure of Video Disk Recorder 200)

Next, a second embodiment of the present invention will be described in detail. FIG. 5 is a block diagram showing schematically a video disk recorder 200 according to the second embodiment of the optical disk recording/playback apparatus of the present invention.

Referring to the same Figure, the video disk recorder 200 records and plays back information signal on and from the optical disk 1 via the pickup 2 like the aforementioned video disk recorder 100. Particularly, the video disk recorder 200 has a function for linking new information signal in the back of an area in which information signal is already recorded on the optical disk 1.

In this video disk recorder 200, the pickup 2 plays back a recorded area at a low laser power and upon linking, recording is carried out in a non-recorded area adjacent to this recorded area continuously with the recorded area at a high laser power.

Then, a data signal preamplifier 21 for amplifying data signal read out from the optical disk 1, a wobble detecting circuit 25 for detecting a wobble recorded in a track of the optical disk 1, a preformat address detecting circuit 27 for detecting preformat synchronous signal and a land pre-pit recorded in the optical disk 1 in advance and a laser driving circuit 9 for controlling an operation of the pickup 2 are connected to the pickup 2.

A playback clock generation circuit 22 is connected to a data signal preamplifier 21. The playback clock generating circuit 22 generates a playback clock necessary for playback count which counts a timing for playback by playing back data recorded in the recorded area. More specifically, playback clock is calculated from length of pits and interval between pits for data recorded in the recorded area. Then, playback clock generated in the playback clock generating circuit 22 are transmitted to the phase comparison circuit 23 and counting circuit 30.

The aforementioned wobble detecting circuit 25 detects a waveform of a wobble recorded preliminarily on the optical disk 1 so that it is pre-formatted. An output from the wobble detecting circuit 25 is inputted to the write clock generating circuit 26. This write clock generating circuit 26 generates a write clock necessary for carrying out recording count which counts a timing for recording user data outputted from the user data supplying circuit 6 into the optical disk 1, based on wobble signal waveform supplied from the wobble detecting circuit 25 and a correction signal supplied from the correction operation circuit 32. The write clock generated here is transmitted to the phase comparison circuit 23 and recording signal generating circuit 8.

The phase comparison circuit 23 detects a phase deviation by comparing the phase of playback clock with the phase of the write clock and a value of the phase difference is transmitted to a terminal of the selection switch SW28 via the low pass filter (LPF) 24. This selection switch SW28 inputs a timing signal for starting a linking outputted from the linked recording start timing generating circuit 31 as a selection control signal and carries out connection or cutting of an output from the phase comparison circuit 23 to the correction operation circuit 32. The pre-format address detecting circuit 27 reads out a pre-format synchronous signal and land pre-pit of the optical disk 1, and controls an operation of the CPU 29 and counting circuit 30 by detecting the pre-format synchronous signal. The CPU 29 controls entirely the video disk recorder 200.

The correction operation circuit 32 outputs a correction signal to the write clock generating circuit 26 so that a write clock generated from the wobble signal outputted from the wobble detecting circuit 25 is outputted synchronously with the playback clock in the write clock generating circuit 26, based on a phase difference signal supplied from the LPF 24 via the selection switch SW28. More specifically, by adding or subtracting a phase difference between the playback clock and write clock to and from the phase of a write clock generated from the wobble signal, it makes the phase of a write clock outputted from the write clock generating circuit 26 coincide with the phase of the playback clock.

On the other hand, the aforementioned counting circuit 30 detects an address on the optical disk 1 based on the output of the pre-format address detecting circuit 27 or playback clock generating circuit 22 and upon linking, counts for detecting a linking area located a border between the recorded area and non-recording area. A result of detection on this counting circuit 30 is outputted to the linked recording start timing generating circuit 31. This linked recording start timing generating circuit 31 computes a timing for starting the linking and outputs a result of this computation to the recording signal generating circuit 8 and at the same time, to the selection switch SW28 as a selection control signal.

The recording signal generating circuit 8 generates a recording signal based on an output from the write clock generating circuit 26 and respective outputs of the linked recording start timing generating circuit 31, user data supplying circuit 6, and ID data generating circuit (not shown) and transmits it to the laser driving circuit 9. The laser driving circuit 9 records information signal on the optical disk 1 by means of the pickup 2 based on a recording signal generated from the recording signal generating circuit 8.

(Operation of Video Disk Recorder 200)

Next, an operation of linking with the video disk recorder 200 having such a structure will be described. FIG. 6 is a diagram for explaining a recording/playback operation of the video disk recorder 200 according to the second embodiment of the optical disk recording/playback apparatus of the present invention. According to this embodiment, different from the video disk recorder 100 according to the first embodiment, the linking does not have to be carried out only in a predetermined linking area. When the linking is carried out, first, a recorded area is played back. Then, at the same time when a last recording termination point is exceeded, new data can be recorded in a non-recorded area.

As shown in sections (A)–(C) of FIG. 6, in the recorded area A, generation of the playback clock and generation of write clock are carried out. More specifically, a playback clock (indicated in (B) of FIG. 6) is generated from data signal by the playback clock generating circuit 22 and the write clock generating circuit 26 generates a write clock (indicated in (C) of FIG. 6) from the wobble signal. In this while, linking is kept OFF. Further, the switch SW28 is ON (indicated by (D) in FIG. 6) so that the LPF 24 is connected to the correction operation circuit 32. The phase comparison circuit 23 detects a phase difference between a playback clock and a write clock and transmits it to the correction operation circuit 32 via the switch SW28. The correction operation circuit 32 transmits a correction signal to the clock generating circuit 26 so as to synchronize the playback clock with the write clock based on the phase difference value.

During a playback of the recorded area A, a playback clock from the playback clock generating circuit 22 is transmitted to the counting circuit 30. This counting circuit 30 is turned ON when a pre-format synchronous signal supplied from the pre-format address detecting circuit 27 is inputted ((F) in FIG. 6) so that counting of a playback clock is started ((G) in FIG. 6). Based on counting by the counting circuit 30, the linked recording start timing generating circuit 31 detects a last recording termination point E and counts a timing of linking start.

If a reading position of the pickup 2 reaches the linked recording start point S, linking is started ((E) in FIG. 6). Then, the linked recording start timing generating circuit 31 instructs to start recording of user data B to the recording signal generating circuit 8 and correspondingly, the laser driving circuit 9 increases laser power for recording so as to start recording ((H) in FIG. 6).

On the other hand, when the linked recording start point is passed, the linked recording start timing generating circuit 31 turns OFF the switch SW28 so as to cut off a connection between the LPF 24 and correction operation circuit 32. With this condition, the counting circuit 30 is turned OFF ((A), (D), (G) in FIG. 6).

At the same time when the last recording termination point E is passed, a supply of the phase difference value from the LPF 24 is cut out. As a result, only the wobble signal is inputted from the wobble detecting circuit 25 to the write clock generating circuit 26 and the write clock is generated based on only this signal ((A)–(C) in FIG. 6). A write clock generated based on a signal from the wobble is transmitted to the recording signal generating circuit 8 and then, the recording signal generating circuit 8 generates a recording signal corresponding to this write signal.

At an instant of this linking, a non-synchronous signal is inputted into the write clock generating circuit 26 at the same time when the linking area S is passed. The write clock generating circuit 26 reacts with a change of signal mildly. As a result, the clock changes gradually from a write clock synchronous with the playback clock to a write clock generated based on the wobble. Because this change of the clock can be carried out so that both the clocks are continuous, an occurrence of data reading error in the linking area can be prevented.

(Effect of Video Disk Recorder 200)

In the video disk recorder 200 of this embodiment, in the linking area, the clock changes mildly from a write clock synchronous with the playback clock to a write clock generated based on the wobble preliminarily recorded on the optical disk 1, so as to avoid incontinuity of recording in the linking area. As a result, it is possible to prevent an occurrence of an error in the linking area.

Third Embodiment (Structure of Video Disk Recorder 300)

Hereinafter, a third embodiment of the optical disk recording/playback apparatus of the present invention will be described. FIG. 7 is a block diagram showing schematically a video disk recorder 300 according to a third embodiment of the optical disk recording/playback apparatus of the present invention. The third embodiment of the present invention will be described in detail.

As shown in FIG. 7, the video disk recorder 300 records and plays back information signal on the optical disk 1 by means of the pickup 2.

In the same Figure, a focus error detecting circuit 41 and an address detecting circuit 46 for detecting an address pre-formatted on a track of the optical disk 1 are connected to the pickup 2. The focus error detecting circuit 41 detects a focus error of laser beam of the pickup 2 and the detected focus error is transmitted to a focus servo circuit 42 via an adding circuit 48. The focus servo circuit 42 drives the actuator drive circuit 43 according to the focus error. The actuator drive circuit 43 drives the actuator (not shown) so as to lift up/down an objective lens of the pickup 2 with respect to a signal face of the optical disk 1 to eliminate the focus error.

On the other hand, the address detecting circuit 46 outputs a detected address to the timing generating circuit 47. The timing generating circuit 47 counts a timing for changing over the selection switch SW44 based on an address detected by the address detecting circuit 46. This selection switch SW44 connects an offset voltage generating circuit 45 to an adding circuit 48 based on a control signal from the timing generating circuit 47.

The offset voltage generating circuit 45 generates and holds an offset compensation voltage of a predetermined value to eliminate a loss of focus due to a change of the wave length of laser caused upon change from playback to recording. That is, in order to immediately eliminate a loss of the focus of laser beam caused when a changeover from playback to recording just at the timing of passing of the linking start point, this offset compensation voltage is applied to the focus servo circuit 42. Consequently, the actuator drive circuit 43 is made to carry out focus adjustment preliminarily so as to make the focus point of laser beam a focus point upon recording, before linking start, so that it comes that when the linking is started, a loss of the focus is already corrected.

The offset compensation voltage is a voltage to be applied to focus laser beam which is focused under a playback power even when the laser power is used at a recording power larger than the playback power.

FIG. 8 is a diagram showing a relation between voltage and a deviation of the pickup when the focus error signal is applied. In the same figure, although a focus point shown by the focus error signal (FE) under the playback power is O1, it moved to O2 in case of the recording power. Therefore, it is necessary to match the focus point O1 with O2 before the playback power changes to the recording power. According to the offset compensation voltage of this embodiment, to eliminate the offset voltage shown in the figure, a predetermined voltage v is applied to the focus error signal and then the FE under the playback power is raised so as to match a point O3 on the FE under the playback power with O2.

(Operation of Video Disk Recorder 300)

Next, a linking operation of the video disk recorder 300 having such a structure will be described. FIG. 9 is a diagram for explaining the linking operation of the video disk recorder 300 according to the third embodiment of the optical disk recording/playback apparatus of the present invention.

First, an address and a focus error are detected in a recorded area under the playback mode ((A) in FIG. 9). In this while, a linking start point S is detected by the address detecting circuit 46 so as to measure a timing for the linking start by the timing generating circuit 47.

Next, just before a position of the pickup 2 approaches the linking start point S, the timing generating circuit 47 turns ON the selection switch 44 (indicated in (B) of FIG. 9) so as to supply an offset compensation voltage from the offset voltage generating circuit 45 to the adding circuit 48. With addition of this offset compensation voltage, the wave length of laser beam projected by the pickup 2 changes, so that to eliminate a loss of the focus, the focus servo circuit 42 and actuator drive circuit 43 deflect a position of the objective lens of the pickup 2 (indicated in (C) and (D) of FIG. 9).

When the linking start point S is passed, the playback mode is changed to the recording mode and the timing generating circuit 47 turns OFF the selection switch 44 so as to cut off a supply of the offset compensation voltage (indicated in (A) and (B) of FIG. 9). If the playback mode is changed to the recording mode, the wave length of laser beam is changed. Although with this, the focus point begins to move, because the loss of the focus has been already eliminated by the offset compensation voltage, this loss of the focus does not occur at the linking start point S and further the objective lens does not move (indicated in (C) and (D) of FIG. 9).

(Effect of Video Disk Recorder 300)

Because the video disk recorder 300 of this embodiment prevents a loss of the focus at the linking start point S, the loss of the focus just after a linking start can be eliminated and an accurate pit can be formed on a track just after recording is started, thereby securing data reliability.

According to the optical disk recording/playback apparatus of the present invention, as described above, when additionally recording new data just after an already recorded area, that is, carrying out so-called linking in a recordable/reproducible type optical disk such as DVD-R, an occurrence of a non-recording gap or an overwrite in a linked portion can be prevented so as to prevent an error upon playback, thereby making it possible to record data finely. Consequently, the capacity of the optical disk can be used effectively to a maximum extent.

Further, according to the optical disk recording/playback apparatus of the present invention, when the linking is carried out in such a recording type optical disk, it is possible to prevent an occurrence of an error due to a loss of focus upon linking thereby securing recording of data.

It should be understood that many modifications and adaptations of the invention will become apparent to those skilled in the art and it is intended to encompass such obvious modifications and changes in the scope of the claims appended hereto.

What is claimed is:

1. An optical disk recording/playback apparatus for recording and playing back information signal using an optical disk capable of additionally recording new information signal subsequent to existing recording area in which information signal is recorded, said optical disk having successive ECC blocks thereon each composed of a plurality of sectors each including an ID area in which an ID number is recorded, a user data area in which a user data is recorded, and a CPM area, located after the ID area and before the user data area, in which copy protect information is recorded, said optical disk recording/playback apparatus comprising:

a recording means for recording an information signal on said optical disk;

a supplying means for supplying said recording means with first and second user data to be recorded on the user data area of said optical disk as said information signal; and a first generating means for generating a first data different from the user data and supplying said recording means with the first data, wherein said recording means, after terminating a recording of the first user data, records the first data generated by said generating means in the user data area excluding an area thereof in which an end of the first user data is recorded and in an area from a head to midway of the CPM area in a next sector located after the user data area in which the end of the first user data is recorded, and said recording means, upon recording the second user data, records the first data generated by said generating means in the CPM area excluding an area thereof in which the first data has been already recorded, and records the second user data from a next user data area located after the CPM area, thereby to use the CPM area as a linking area.

2. An optical disk recording/playback apparatus according to claim 1, further comprising:

a playback means for playing back the first and second user data recorded on said optical disk;

a second generating means for generating a second data different from the user data; and an output means for outputting the second data generated by said second generating means instead of the first data recorded on the linking area.

3. An optical disk recording/playback apparatus according to claim 2, wherein the first data and the second data are fixed data.

4. An optical disk recording/playback apparatus according to claim 3, wherein the second data is 0.

* * * * *